(12) United States Patent
Liu et al.

(10) Patent No.: US 7,182,467 B2
(45) Date of Patent: Feb. 27, 2007

(54) MICROSTRUCTURES INTEGRATED INTO A TRANSPARENT SUBSTRATE WHICH SCATTER INCIDENT LIGHT TO DISPLAY AN IMAGE

(75) Inventors: Jian-Qiang Liu, Campbell, CA (US); Xiao-Dong Sun, Fremont, CA (US)

(73) Assignee: Superimaging, Inc., Fremont, CA (US)

( * ) Notice: Subject to any disclaimer, the term of this patent is extended or adjusted under 35 U.S.C. 154(b) by 0 days.

(21) Appl. No.: 10/979,160

(22) Filed: Nov. 3, 2004

(65) Prior Publication Data

US 2005/0094266 A1 May 5, 2005

Related U.S. Application Data

(60) Provisional application No. 60/516,939, filed on Nov. 3, 2003.

(51) Int. Cl.
*G03B 21/14* (2006.01)
*G03B 21/56* (2006.01)

(52) U.S. Cl. .......................................... 353/79; 359/452

(58) Field of Classification Search ................. 353/79, 353/122; 359/452, 453, 615
See application file for complete search history.

(56) References Cited

U.S. PATENT DOCUMENTS

| | | | |
|---|---|---|---|
| 3,598,995 A | 8/1971 | Inoue et al. |
| 3,881,800 A | 5/1975 | Friesem |
| 3,953,117 A | 4/1976 | Cannon |
| 4,158,210 A | 6/1979 | Watanabe et al. |
| 4,689,522 A | 8/1987 | Robertson |
| 4,814,666 A | 3/1989 | Iwasaki et al. |
| 4,960,314 A | 10/1990 | Smith et al. |
| 4,989,956 A | 2/1991 | Wu et al. |
| 5,142,387 A | 8/1992 | Shikama et al. |
| 5,162,160 A | 11/1992 | Matsui et al. |
| 5,233,197 A | 8/1993 | Bowman et al. |
| 5,289,315 A | 2/1994 | Makita et al. |
| 5,347,644 A | 9/1994 | Sedlmayr |
| 5,424,535 A | 6/1995 | Albion et al. |
| 5,473,396 A | 12/1995 | Okajima et al. |
| 5,566,025 A | 10/1996 | Knoll et al. |
| 5,646,479 A | 7/1997 | Troxell |
| 5,684,621 A | 11/1997 | Downing |
| 5,764,403 A | 6/1998 | Downing |
| 5,784,162 A | 7/1998 | Cabib et al. |
| 5,786,582 A | 7/1998 | Roustaei et al. |

(Continued)

FOREIGN PATENT DOCUMENTS

JP      4281422    10/1992

OTHER PUBLICATIONS

Murray, "Head-up displays get second glance", EE Times, Jan. 5, 2004.

(Continued)

*Primary Examiner*—William C. Dowling
(74) *Attorney, Agent, or Firm*—Sherr & Nourse, PLLC

(57) ABSTRACT

In accordance with embodiments, viewable imagines can be created in glass. Viewable images may be created in or on glass (or other at least partially transparent substrate), by using microstructures to scatter light from a projector, while the glass maintains transparent or translucent properties. In embodiments, the microstructures are integrated into glass in patterns.

25 Claims, 7 Drawing Sheets

U.S. PATENT DOCUMENTS

| | | | |
|---|---|---|---|
| 5,914,807 A | 6/1999 | Downing | |
| 5,921,650 A | 7/1999 | Doany et al. | |
| 5,943,160 A | 8/1999 | Downing | |
| 5,956,172 A | 9/1999 | Downing | |
| 5,957,560 A | 9/1999 | Do et al. | |
| 6,064,521 A * | 5/2000 | Burke | 359/443 |
| 6,166,852 A | 12/2000 | Miro | |
| 6,221,112 B1 | 4/2001 | Snider | |
| 6,239,907 B1 * | 5/2001 | Allen et al. | 359/443 |
| 6,261,402 B1 | 7/2001 | Watanabe et al. | |
| 6,327,074 B1 | 12/2001 | Bass et al. | |
| 6,337,769 B1 | 1/2002 | Lee | |
| 6,381,068 B1 * | 4/2002 | Harada et al. | 359/443 |
| 6,439,888 B1 | 8/2002 | Boutoussov et al. | |
| 6,501,590 B2 | 12/2002 | Bass et al. | |
| 6,507,436 B2 | 1/2003 | Nishikawa et al. | |
| 6,654,161 B2 | 11/2003 | Bass et al. | |
| 6,769,773 B1 | 8/2004 | Wu | |
| 6,804,053 B2 * | 10/2004 | Etori et al. | 359/453 |
| 6,809,781 B2 | 10/2004 | Setlur et al. | |
| 6,844,950 B2 * | 1/2005 | Ja Chisholm et al. | 359/456 |
| 6,870,671 B2 | 3/2005 | Travis | |
| 2001/0005282 A1 | 6/2001 | Etori et al. | |
| 2002/0024495 A1 | 2/2002 | Lippert et al. | |
| 2002/0048058 A1 | 4/2002 | Nishikawa et al. | |
| 2002/0080482 A1 * | 6/2002 | Watanabe et al. | 359/452 |
| 2002/0088925 A1 | 7/2002 | Nestorovic et al. | |
| 2002/0120916 A1 | 8/2002 | Snider | |
| 2002/0140338 A1 | 10/2002 | Sluzky | |
| 2002/0190224 A1 | 12/2002 | Tazaki | |
| 2003/0002153 A1 * | 1/2003 | Hiraishi et al. | 359/452 |
| 2003/0198456 A1 | 10/2003 | Steiner et al. | |
| 2003/0213967 A1 | 11/2003 | Forrest et al. | |
| 2003/0214724 A1 | 11/2003 | Fujikawa et al. | |
| 2003/0227004 A1 | 12/2003 | Dopps | |
| 2004/0022071 A1 | 2/2004 | Cheng et al. | |
| 2004/0041988 A1 | 3/2004 | Kitamura | |
| 2004/0070551 A1 | 4/2004 | Walck et al. | |
| 2004/0070824 A1 * | 4/2004 | Toda et al. | 359/452 |
| 2004/0090794 A1 | 5/2004 | Ollett et al. | |
| 2004/0100692 A1 | 5/2004 | Hou | |
| 2004/0114219 A1 | 6/2004 | Richardson | |
| 2004/0135976 A1 | 7/2004 | Ishihara et al. | |
| 2004/0149998 A1 | 8/2004 | Henson et al. | |
| 2004/0164669 A1 | 8/2004 | Kawaguchi et al. | |
| 2004/0224154 A1 * | 11/2004 | Toda et al. | 428/402 |
| 2004/0233526 A1 * | 11/2004 | Kaminsky et al. | 359/452 |
| 2004/0257650 A1 * | 12/2004 | Parusel et al. | 359/453 |
| 2005/0030617 A1 | 2/2005 | Umeya | |
| 2005/0088737 A1 | 4/2005 | Piehl | |
| 2005/0152032 A1 * | 7/2005 | Olofson et al. | 359/453 |

OTHER PUBLICATIONS

E-Window Product Web Page. www.nano-proprietary.com.

Rockwell Collins Product Web Page. www.rockwellcollins.com.

Steigerwald et al., "Illumination With Solid State Lighting Technology", IEEE Journal on Selected Topics in Quantum Electronics, Mar. 2002, vol. 8, No. 2.

Jeon et al. "A novel famrication method for a 64+64 matrix-addressable GaN-based micro-LED array", Phys. Stat. Sol. (a) 200, No. 1, pp. 79-82 (2003).

Hawkyard, "The release of disperse dyes during thermal processing" Journal of the society of dyes and colourists, vol. 97 (1981) 213-219.

ProScreenInc Product Web Page. www.proscreeninc.com.

Web Page from www.smartmotorist.com.

Iwaya, et al., "High Power UV-Light-Emitting Diode on Sapphire", Jpn. J. Appl. Phys. vol. 42(2003) pp. 400-403.

Coosemans et al., "MT-compatible . . . datalinks", Materials Science In Semiconductor Processing, vol. 3 (2000) pp. 475-480.

"Handbook of Plastics, Elastomers, and Composites" Harper, C. McGraw-Hill, 3rd Ed (1996).

Xiao-Dong (Ted) Sun, etc. Identification and optimization of advanced phosphors using combinatorial libraries Appl. Phys. Lett., vol. 70, No. 25, Jun. 23, 1997.

"A Three- Color, Solid- State, Three Dimensional Display", E. Downing et al, Science vol. 273, pp. 1185-1189, 1996.

J. Lewis et al., IEEE Trans Election Devices vol. 18 pp. 724,1971.

* cited by examiner

MICROSTRUCTURES INTEGRATED INTO A TRANSPARENT SUBSTRATE WHICH SCATTER INCIDENT LIGHT TO DISPLAY AN IMAGE

Priority is claimed to U.S. Provisional Patent Application No. 60/516,939, filed in the U.S. Patent and Trademark Office on Nov. 3, 2003.

BACKGROUND

The reproduction of images has had a positive effect on many people's lives. One of the earliest technologies for reproducing images was the movie projector, which allowed for audiences to view theatrical productions without live actors and actresses. Televisions were invented, which allowed people to watch moving pictures in the comfort of their own homes. The first televisions were cathode ray tube (CRT) televisions, which is a technology that is still being used today. During the computer age, it has been desirable to reproduce images which are output from computers through monitors. Like many televisions, many computer monitors use CRT technology.

Other technologies have been developed as substitutes for CRT technology. For example, liquid crystal display (LCD) technology is commonplace for both computer monitors and televisions. A LCD is a relatively thin display, which is convenient for many people. Other examples of displays are plasma displays, rear projections displays, and projectors. As display technology has improved, many new applications are being developed. For example, many attempts have been made to develop displays which create viewable images in glass. However, there have been many technical challenges that have prevented creation of viewable images in glass. Specifically, it has been difficult for glass to be maintained in a substantially transparent state and be able to display viewable images with sufficient illumination and clarity.

SUMMARY

In accordance with embodiments, viewable images can be created in glass. Viewable images may be created in glass by using microstructures to scatter light from a projector, while the glass maintains transparent or translucent properties. In embodiments, the microstructures are integrated into glass in patterns.

In embodiments, an apparatus comprises a transparent substrate (e.g. glass or plastic) and a plurality of microstructures (e.g. having a diameter between about 1 nanometer and 10 micrometers). The plurality of microstructures are integrated into the transparent substrate. The plurality of microstructures scatter incident light to display an image on the transparent substrate.

DRAWINGS

DESCRIPTION

Figure 1:
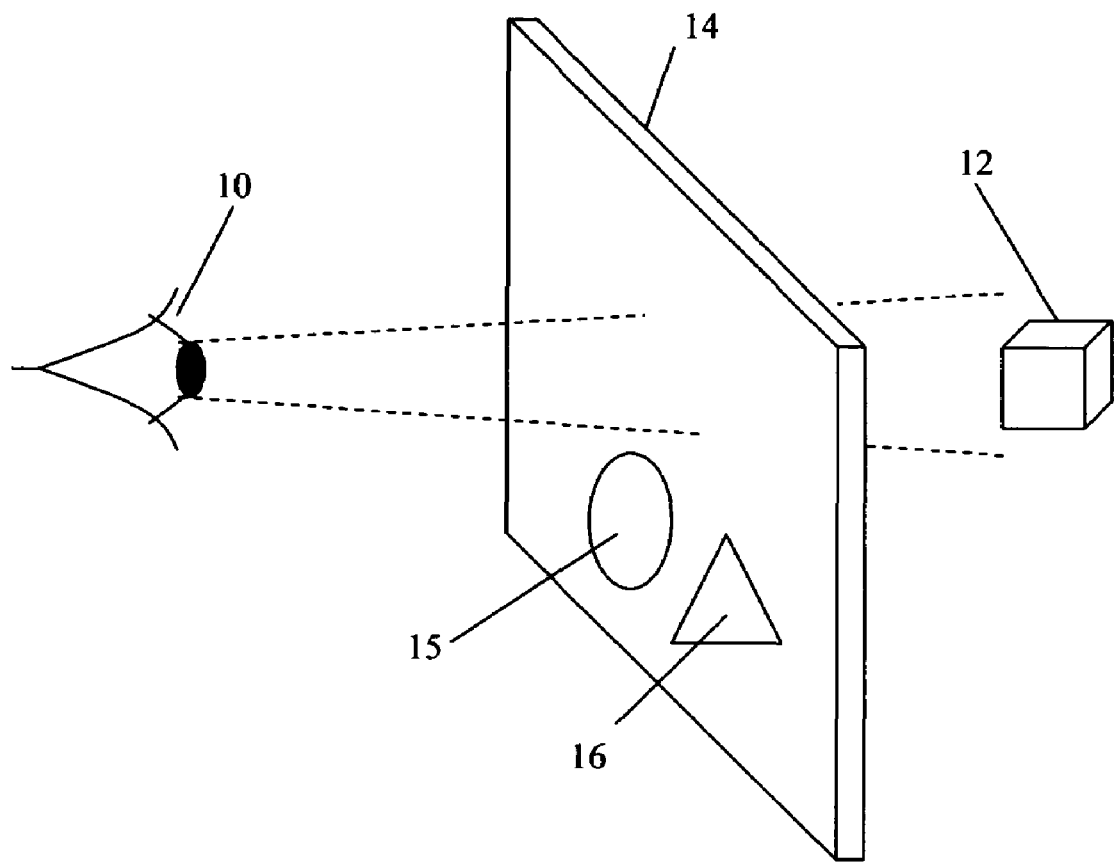
FIG. 1 is an example diagram of a substantially transparent or translucent display.

FIG. 1 is an example diagram of a substantially transparent or translucent display, in accordance with embodiments. Viewer 10 is able to see an arbitrary object (e.g. cube 12) through substrate 14. Substrate 14 may be transparent, substantially transparent, or translucent. While viewer 10 sees arbitrary object 12 through substrate 14, the viewer can also see images (e.g. circle 15 and triangle 16) that are created at substrate 14. Substrate 14 may be part of a vehicle windshield, a building window, a glass substrate, a plastic substrate, a polymer substrate, or other transparent (or substantially transparent) medium that would be appreciated by one of ordinary skill in the art. Other substrates may complement substrate 14 to provide for tinting, substrate protection, light filtering (e.g. filtering external ultraviolet light), and other functions.

Figure 2:
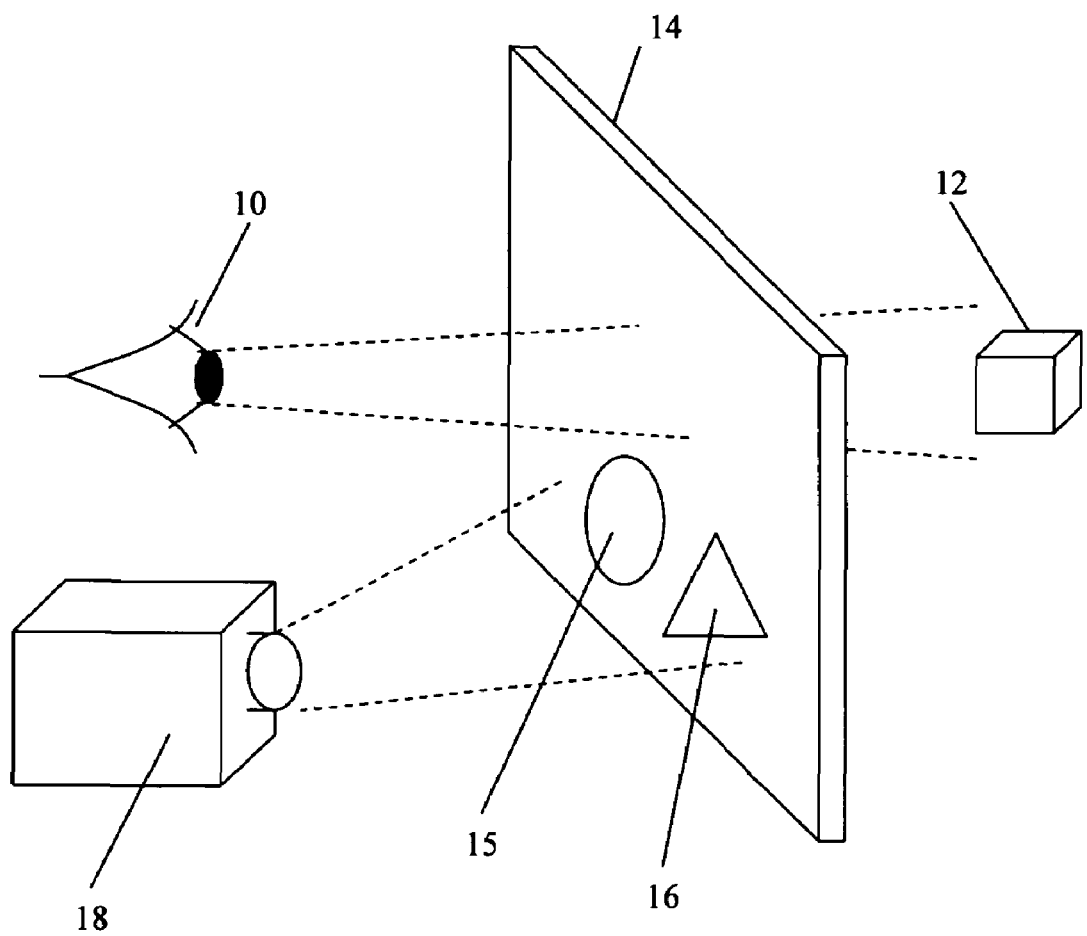
FIG. 2 is an example diagram of a substantially transparent or translucent display illuminated with a visible light from a projector to display an image.

FIG. 2 is an example diagram of a substantially transparent or translucent display illuminated with visible light from a projector to display an image, in accordance with embodiments. Projector 18 projects a visible light image onto substrate 14. Microstructures (not show), which are integrated into the substrate 14, scatter the visible light image originating form projector 18, so that a viewable image is displayed on the substrate 14. Accordingly, view 10 can view an image (e.g. circle 15 and triangle 16) on substrate 14, while also viewing an object (e.g. cube 12) through substrate 14. In embodiments, light from projector 18 is incident onto substrate 14 at a first angle. Light that is scattered at substrate 14 (e.g. light of images of circle 15 and/or triangle 16) is directed to viewer 10 at a second angle. The first angle and the second angle may be different. In embodiments, microstructures may be integrated into substrate 14 by at least one of printing, stamping, photolithography, and/or micro-contact printing. One of ordinary skill in the art would appreciate that projector 18 may be on the same or different side of substrate 14 as viewer 10.

Figure 3:
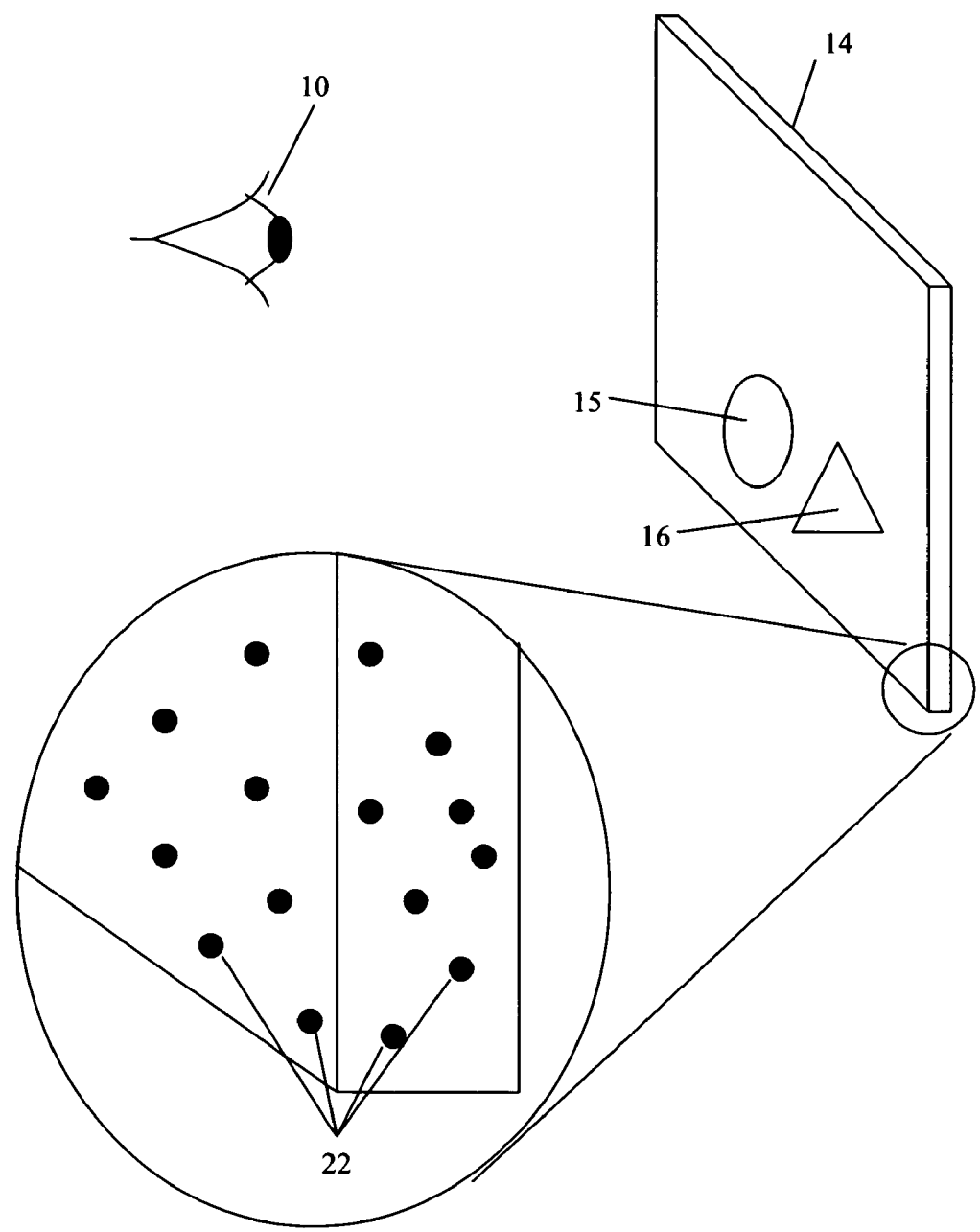
FIG. 3 is an example diagram of microstructure dispersed in a substantially transparent or translucent substrate.
Figure 4:
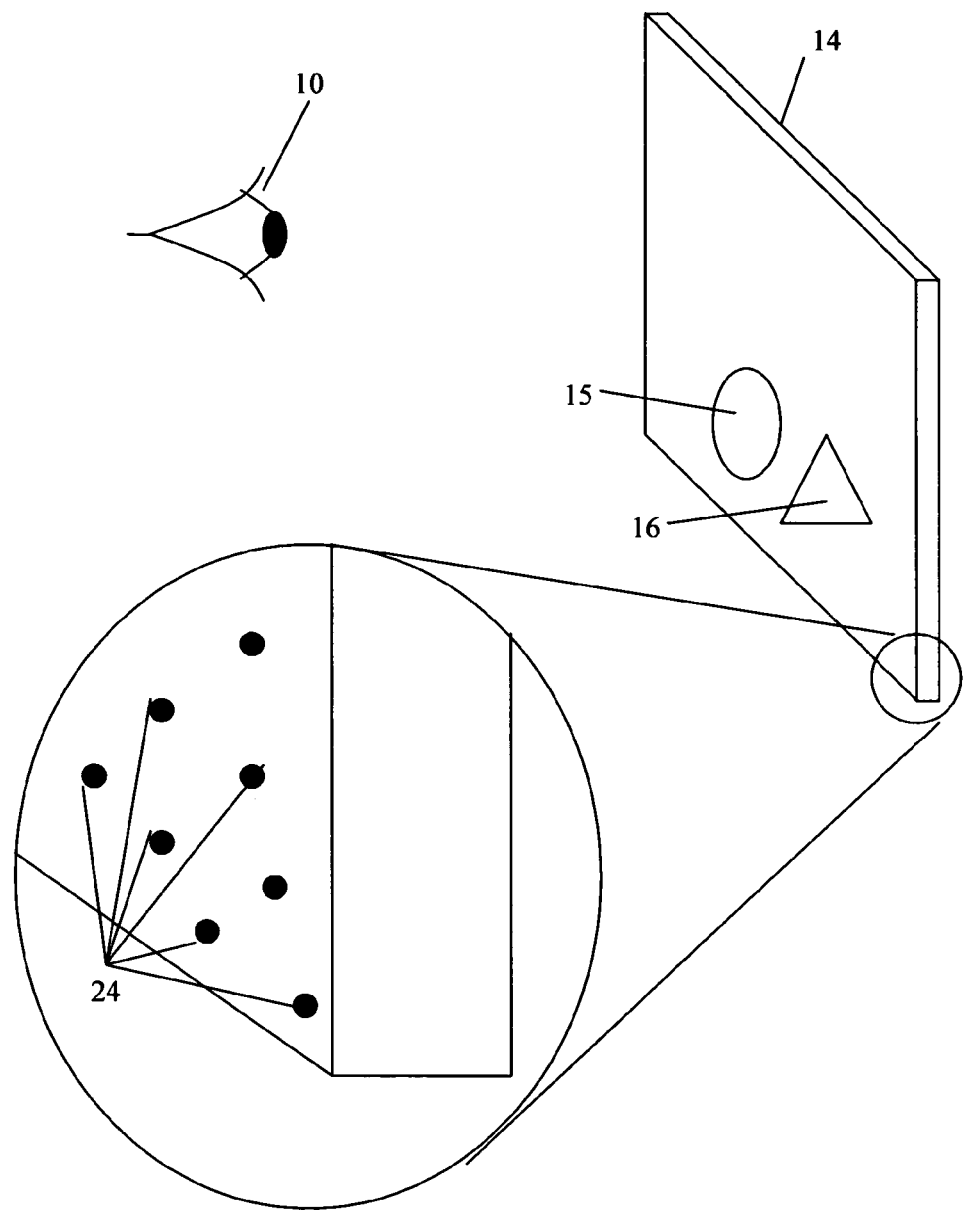
FIG. 4 is an example diagram of microstructures disposed on a surface of a substantially transparent or translucent substrate.

FIG. 3 is an example diagram of microstructures dispersed in a substantially transparent or translucent substrate, according to embodiments. Microstructures 22 are dispersed in substrate 14. FIG. 4 is an example diagram of microstructures disposed on a surface of a substantially transparent or translucent substrate. Microstructures 24 are coated on substrate 14. In embodiments, each of the plurality of microstructures 24 has a diameter between about 1 nanometer and about 10 micrometers. In embodiments, each of the plurality of microstructures has a diameter between about 10 nanometers and 1 micrometer. In embodiments, microstructure 22 may be organic pigments and/or organic particles. In embodiments, microstructures 22 may be inorganic pigments and/or inorganic particles. In embodiments, microstructures may include at least one of titanium oxides, silica, alumina, latex, and/or polystyrene particles.

The plurality of microstructures, in embodiments, may be isotropically scattering particles. Isotropically scattering particles are particles which scatter light the same way, regardless of the direction of the incident light. However, in embodiments, the plurality of microstructures may be unisotropically scattering particles. Unisotropically scattering particles may scatter light differently, depending on the direction of the incident light.

Figure 5:
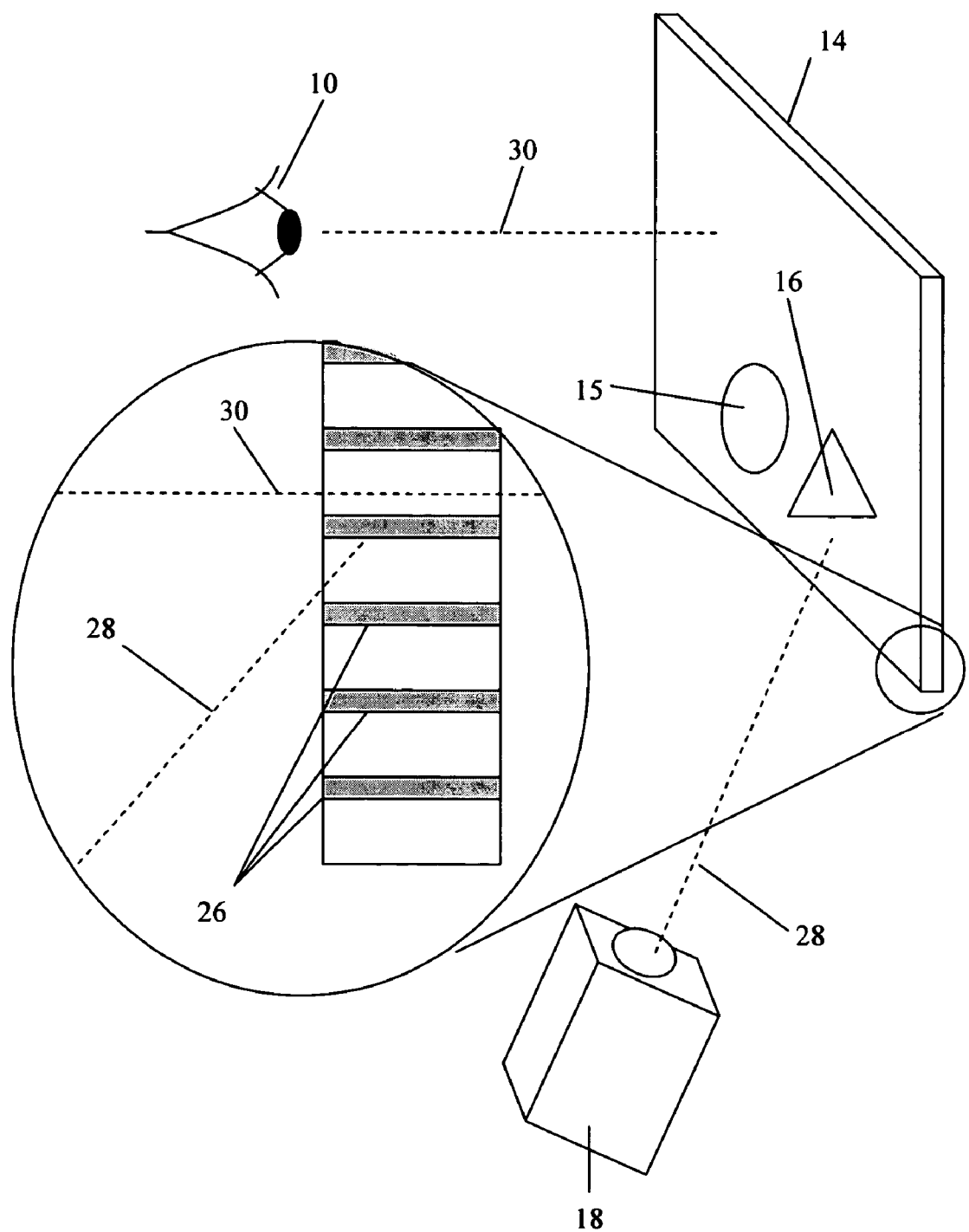
FIG. 5 is an example diagram of a pattern of microstructures dispersed in a substantially transparent or translucent substrate.

FIG. 5 is an example diagram of a pattern of microstructures dispersed in a substantially transparent or translucent substrate. Microstructures 26 are selectively dispersed in substrate 14 in regions. The width of the regions of microstructures 26 may be in a range of about 1 nanometer to about 10 millimeters. The regions of microstructures 26 form a pattern (e.g. a blind or a grid), such that there is limited cross-section of viewer's 10 light paths 30 with the microstructures 26. In embodiments, the pattern is repetitive. The fill-factor of the pattern may be in a range of about 0.01% to about 99%. However, the light path 28 from projector 18 may be at an angle with the regions of microstructures 26 to maximize the cross-section with the microstructures 26, increasing the scattering of a visible image from projector 18 to increase illumination of the visible image on substrate 14. The pitch of the regions of microstructures 26 may be in a range of about 1 nanometer to about 10 millimeters. The thickness of the regions of microstructures 26 may be in a range of about 1 micrometer to about 10 millimeters. The thickness of the regions of microstructures 26 may be smaller than the width and/or pitch of the regions of microstructures 26.

Figure 6:
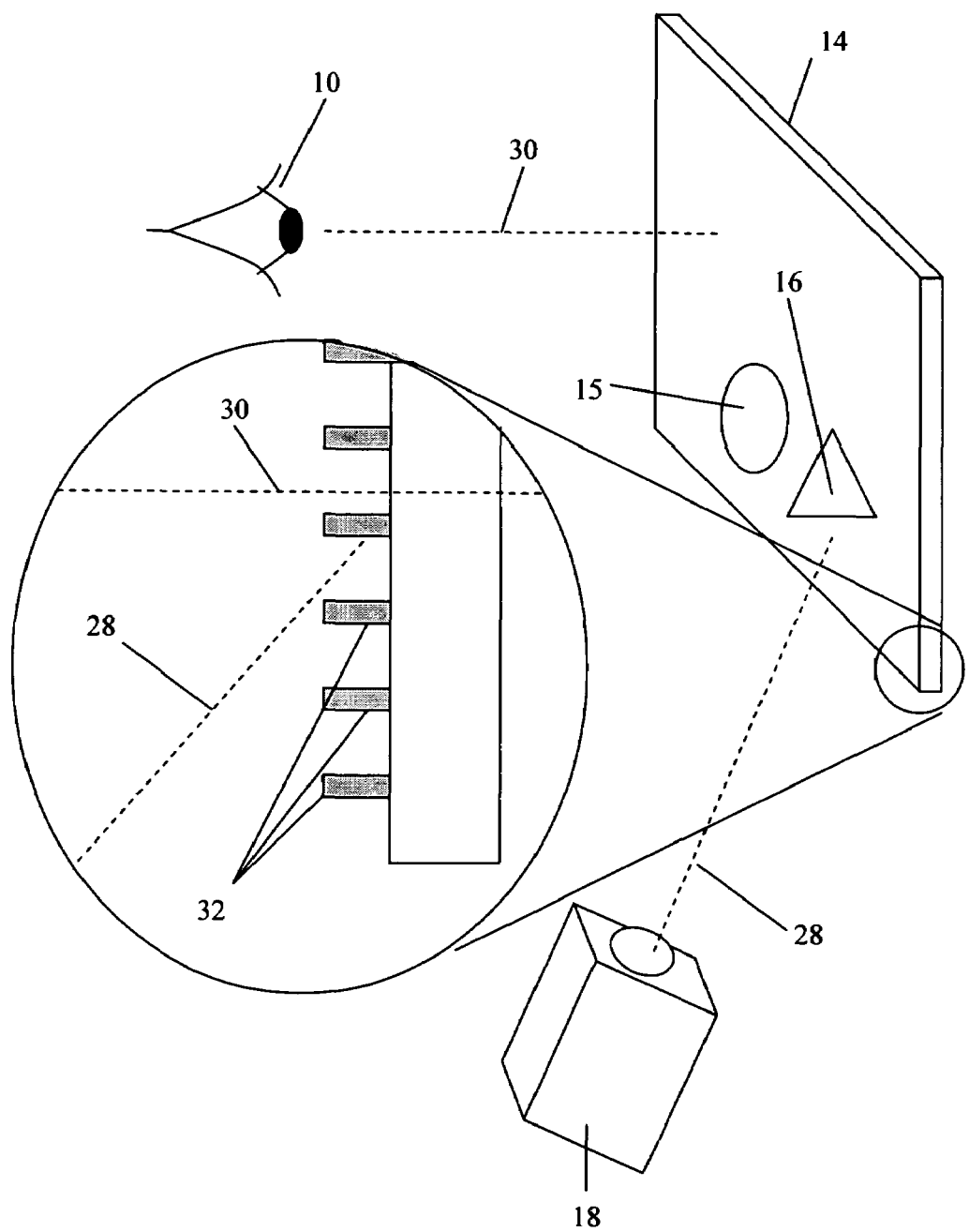
FIG. 6 is an example diagram of a pattern of microstructures disposed on a surface of a substantially transparent or translucent substrate.

FIG. 6 is an example diagram of a pattern of microstructures disposed on a surface of a substantially transparent or translucent substrate, similar to FIG. 5, in accordance with embodiments. Microstructures 32 may be coated in regions on substrate 14. The regions of microstructures 32 form a blind, such that there is limited (e.g. minimize) cross-section of viewer's 10 light paths 30 with microstructures 32. However, the light path 28 from projector 18 may be at an angle with the regions of microstructures 32 to maximize the cross-section with the microstructures 26, increasing the scattering of a visible image from projector 18 to increase illumination of the visible image on substrate 14. In embodiments, the cross-section with the surface of substrate 14 of each element of pattern of microstructures 32 is less than the depth of the pattern substantially perpendicular to substrate 14, which may increase the transparency of substrate 14.

Figure 7:
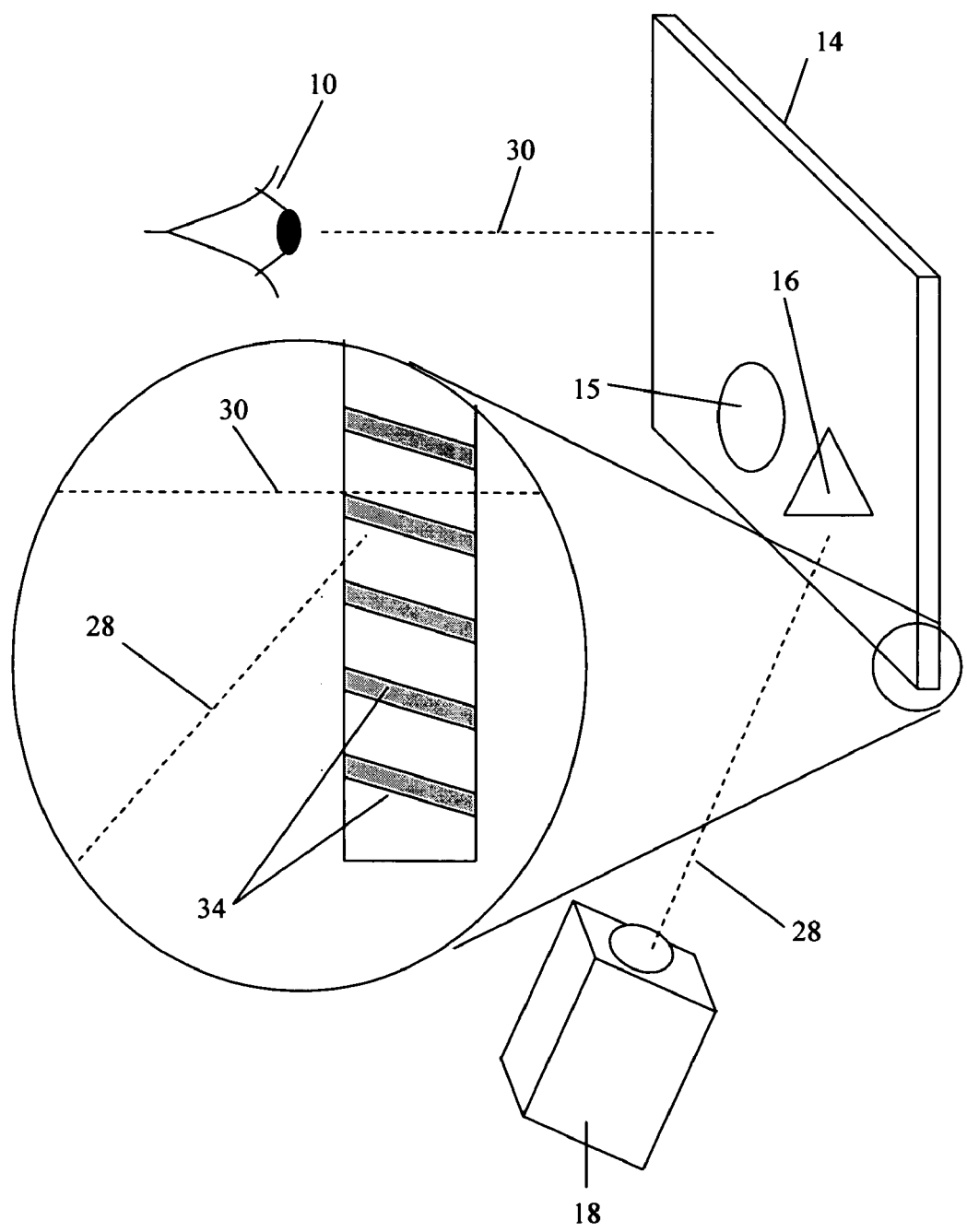
FIG. 7 is an example diagram of an angled pattern of microstructures dispersed in a substantially transparent or translucent substrate.

FIG. 7 is an example diagram of an angled pattern of microstructures dispersed in a substantially transparent or translucent substrate, similar to FIG. 5, in accordance with embodiments. Slanted regions of microstructures 34 are formed in substrate 14. The angle of the slanted regions of microstructures 34 affects the cross-sectional area of both the viewer's 10 light path 30 and light path 28 of projector 18. By increasing the cross-section of light path 28, increased scattering of viewable images may be accomplished, thereby increasing the illumination at substrate 14 of the viewable image. In embodiments, slanted regions of microstructures can also be accomplished by coating the regions of microstructures on substrate 14.

Embodiments relate to transparent projective displays with partially or directional transparent screens. In this display, a regular full color optical projector (or monochromatic scanner) may be applied to a partially or directional transparent screen to display an optical image. A partially or directional transparent screen may have dual characteristics. First, a partially or directional transparent screen may be sufficiently transparent to allow visual penetration of ambient light. Second, a partially or directional transparent screen may be filled or coated with reflective small particles or micro-structures that will deflect or scatter the projected optical images as a display screen. Such particles and micro-structures will not completely block the visible view through windows.

There are several approaches to prepare a partially or directional transparent screen, in accordance with embodiments. A transparent or translucent glass or plastic plate may be filled by fine particles from 1 nanometer to 10 micrometers. A transparent or translucent glass or plastic plate may be coated by fine particles from 1 nanometer to 10 micrometers. A transparent or translucent thin glass sheet or plastic film may be filled by fine particles from 1 nanometer to 10 micrometers. A transparent or translucent thin glass sheet or plastic film may be coated by fine particles from 1 nanometer to 10 micrometers. A diffusive grid may be embedded in or patterned on the surfaces of transparent or translucent glass or plastics sheets.

Both organic and inorganic particles or pigments may be applied in or on a partially or directional transparent screen. Some examples include titanium oxides, silica, alumna, latex, polystyrene particles. In embodiments, the size of the particles may range from about 1 nanometer to about 10 micrometers. In embodiments, the size of the particles ranges from about 10 nanometers to about 1 micrometers. These light scattering materials can be evenly dispersed into the glass or plastic hosts at appropriate concentrations, or they can be coated on the glass or plastic surfaces with an appropriate thickness. A protective overcoat or another layer of host can be applied on the particle coat to prevent the damage to the surface on physical touch.

The glass for a partially or directional transparent screen may include inorganic solids which are transparent or translucent to the visible light. Examples of such inorganic solids are oxides and halides. The glass may include silicates, borosilicate, lead crystal, alumina, silica, fused silica, quartz, glass ceramics, metal fluorides, and other similar materials. These types of glass may be used as the window in rooms, buildings, and/or moving vehicles.

Plastics for a partially or directional transparent screen may include organic and polymeric solids, which are transparent or translucent to the visible light. Thermoplastics for fluorescent screens may include special thermoset solids, such as transparent gels. Some examples of the plastics include polyacrylic, polycarbonate, polyethylene, polypropylene, polystyrene, PVC, silicone, and other similar materials. Micro-structures may be integrated into the screen plate or on the surface, to deflect the projected image from an angle, while allowing the substantial visible transparency at normal viewing angles. An opaque diffusive grid may be embedded in the thin glass or plastic sheet. The area of the light scattering grid from a viewer who stands in front of the screen is substantially smaller than that from the image projector.

Directional transparent screen structures, in accordance with embodiments, may offer many advantages. Directional transparent screen structures may be substantially transparent to the viewer normal or slightly off the normal angle to the screen. Directional transparent screen structures may have a high reflectance or deflection to the projection image at a tilting angle to the screen. A columnar transparent region may be solid opaque to the projection image at the tilting angle. Such strong image scattering may enhance the contrast of the projection images on the display window, while not blocking the direct view normal to the screen. Directional transparent screen structures may be useful in automobiles, where the driver's view is typically normal to the windshield glass. In embodiments, opaque columns trespass the depth of a transparent host glass or plastics. In embodiments, the sizes and the density of the microstructures on the screen may be varied to adjust to transparency of normal view and reflectance image contrast. The depth of the screen and the projection angle may also be varied to tune the contrast and transparency.

In embodiments, the surfaces of the screen may be patterned to various unisotropic structures to function as an "unisotropic" screen. For example, a pattern of overcoat with certain thickness (e.g. 10 nanometer to 1 millimeter) can be applied to the screen surfaces, by various printing, stamping, photolithographic methods, micro-contact printing, and other similar methods. Such printing may form a pattern of very fine scattering features and structures on the surface of the screen, which may allow for angular scattering and displaying of projected images, while allowing a substantially direct view through the screen at a substantially normal angle to the screen.

The foregoing embodiments (e.g. microstructures integrated into a transparent substrate which scatter incident light to display an image) and advantages are merely examples and are not to be construed as limiting the appended claims. The above teachings can be applied to other apparatuses and methods, as would be appreciated by one of ordinary skill in the art. Many alternatives, modifications, and variations will be apparent to those skilled in the art.

What is claimed is:

1. An apparatus comprising:
   a transparent substrate; and
   a plurality of microstructures integrated into the transparent substrate which scatter incident light to display an image on the transparent substrate, wherein the microstructures are integrated into the transparent substrate in a pattern and the cross-sectional area of the pattern at a first angle is greater than the cross-sectional area of the pattern at a second angle.

2. The apparatus of claim 1, wherein each of the plurality of microstructures has a diameter between about 1 nanometer and about 10 micrometers.

3. The apparatus of claim 2, wherein each of the plurality of microstructures has a diameter between about 10 nanometers and about 1 micrometer.

4. The apparatus of claim 1, wherein the plurality of microstructures are isotropically scattering particles.

5. The apparatus of claim 4, wherein:
   the plurality of microstructures scatters light from a projector to display the image on the transparent substrate; and
   the projector projects light at a first angle onto the transparent substrate.

6. The apparatus of claim 5, wherein the plurality of microstructures scatters the light projected from the projector at a second angle which is different from the first angle.

7. The apparatus of claim 1, wherein the plurality of microstructures are unisotropically scattering particles.

8. The apparatus of claim 1, wherein the microstructures are coated onto the transparent substrate.

9. The apparatus of claim 1, wherein the microstructures are dispersed in the transparent substrate.

10. The apparatus of claim 1, wherein the pattern is repetitive at the transparent substrate.

11. The apparatus of claim 1, wherein the pitch of the pattern is in a range of about 1 nanometer to about 10 millimeters.

12. The apparatus of claim 1, wherein the thickness of the pattern is in a range of about 1 micrometer to about 10 millimeters.

13. The apparatus of claim 1, wherein the width of the pattern is in a range of about 1 nanometer to about 10 millimeters.

14. The apparatus of claim 1, wherein the pattern has a fill-factor in a range of about 0.01% to about 99%.

15. The apparatus of claim 1, wherein:
   the plurality of microstructures scatters light from a projector to display the image on the transparent substrate; and
   the projector projects light at the first angle onto the transparent substrate.

16. The apparatus of claim 15, wherein the plurality of microstructures scatters the light projected from the projector at the second angle.

17. The apparatus of claim 1, wherein the width of each element of the pattern is less than the depth of each element of the pattern.

18. The apparatus of claim 1, wherein the transparent substrate comprises at least one of glass and plastic.

19. The apparatus of claim 1, wherein the microstructures comprise at least one of:
   organic pigments; and
   organic particles.

20. The apparatus of claim 1, wherein the microstructures comprise at least one of:
   inorganic pigments; and
   inorganic particles.

21. The apparatus of claim 1, wherein the microstructures comprise at least one of:
   titanium oxides;
   silica;
   alumna;
   latex; and
   polystyrene particles.

22. The apparatus of claim 1, wherein the microstructures are integrated into the transparent substrate by at least one of:
   printing;
   stamping;
   photolithography; and
   micro-contact printing.

23. The apparatus of claim 1, wherein the plurality of microstructures are comprised in a light deflecting surface.

24. The apparatus of claim 1, wherein the plurality of microstructures are light deflecting optical material.

25. The apparatus of claim 1, wherein the plurality of microstructures are comprised in at least one of:
   a light scattering surface; and
   a light deflecting surface.

* * * * *